US009744951B2

(12) United States Patent
Sussek

(10) Patent No.: US 9,744,951 B2
(45) Date of Patent: Aug. 29, 2017

(54) METHOD FOR SETTING A PARKING BRAKE IN A VEHICLE

(71) Applicant: Robert Bosch GmbH, Stuttgart (DE)

(72) Inventor: Ullrich Sussek, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/595,509

(22) Filed: Jan. 13, 2015

(65) Prior Publication Data
US 2015/0239439 A1 Aug. 27, 2015

(30) Foreign Application Priority Data

Feb. 25, 2014 (DE) ........................ 10 2014 203 350

(51) Int. Cl.
| B60T 8/00 | (2006.01) |
| B60T 8/172 | (2006.01) |
| B60T 8/171 | (2006.01) |
| B60T 13/58 | (2006.01) |
| B60T 13/66 | (2006.01) |
| B60T 13/74 | (2006.01) |
| F16D 55/226 | (2006.01) |
| F16D 65/18 | (2006.01) |

(Continued)

(52) U.S. Cl.
CPC .............. B60T 8/172 (2013.01); B60T 8/171 (2013.01); B60T 13/588 (2013.01); B60T 13/662 (2013.01); B60T 13/741 (2013.01); F16D 55/226 (2013.01); F16D 65/18 (2013.01); *F16D 2121/04* (2013.01); *F16D 2121/14* (2013.01)

(58) Field of Classification Search
CPC .... B60T 13/662; B60T 13/741; B60T 13/588; F16D 65/14; F16D 2121/24; F16D 55/226; F16D 65/18; F16D 2121/04; F16D 2121/14
USPC .......................................... 701/70
See application file for complete search history.

(56) References Cited

U.S. PATENT DOCUMENTS 4,207,611 A * 6/1980 Gordon ................ G01R 31/007
324/503
8,506,021 B2 * 8/2013 Moon ..................... B60T 8/174
303/20

(Continued)

FOREIGN PATENT DOCUMENTS

DE 10 2006 052 810 A1 5/2008
DE 10 2012 206 226 A1 10/2013

*Primary Examiner* — Behrang Badii
*Assistant Examiner* — Daniel L Greene
(74) *Attorney, Agent, or Firm* — Maginot, Moore & Beck LLP

(57) ABSTRACT

A method for setting a parking brake includes determining a standard deviation from a current curve of an electric brake motor. The current curve is based on measured current valued. The method further includes determining an electromechanical clamping force. The electromechanical clamping force can be determined based on a correcting current or the current values of the brake motor. The correcting current is determined if the standard deviation exceeds a limit value and motor parameters of the brake motor being determined using the correcting current. The parking brake includes an electromechanical braking mechanism having the electric brake motor configured to generate an electromechanical clamping force.

15 Claims, 2 Drawing Sheets

(51) Int. Cl.
  *F16D 121/04*   (2012.01)
  *F16D 121/14*   (2012.01)

(56) References Cited

U.S. PATENT DOCUMENTS

| | | | | |
|---|---|---|---|---|
| 2004/0026989 | A1* | 2/2004 | Suzuki | B60T 17/16 303/89 |
| 2007/0084682 | A1* | 4/2007 | Griffith | B60T 8/00 188/156 |
| 2008/0283345 | A1* | 11/2008 | Balz | F16D 65/18 188/72.6 |
| 2010/0026224 | A1* | 2/2010 | Kollner | H02H 7/0851 318/432 |
| 2010/0308645 | A1* | 12/2010 | Maron | B60T 13/588 303/20 |
| 2010/0324376 | A1* | 12/2010 | Chinnadurai | G06Q 50/22 600/300 |
| 2011/0295478 | A1* | 12/2011 | Jeon | B60T 7/107 701/70 |
| 2013/0211684 | A1* | 8/2013 | Baehrle-Miller | B60T 7/107 701/70 |

* cited by examiner

METHOD FOR SETTING A PARKING BRAKE IN A VEHICLE

This application claims priority under 35 U.S.C. §119 to patent application no. DE 10 2014 203 350.0 filed on Feb. 25, 2014 in Germany, the disclosure of which is incorporated herein by reference in its entirety.

The disclosure relates to a method for setting a parking brake in a vehicle in accordance with the disclosed subject matter.

BACKGROUND

DE 10 2006 052 810 A1 discloses a method for estimating the clamping force that is generated by an electric brake motor in a parking brake of a motor vehicle. The electric brake motor adjusts a brake piston axially against a brake disc and said brake piston is the carrier of a brake pad. The clamping force that is generated as a result is determined by taking into account the current, the supply voltage of the brake motor and also the motor rotational speed using a system of differential equations that models the electrical and the mechanical behavior of the brake motor.

The brake motor is likewise supplied with current in a manner similar to a sequential connection of further electrical consumers by way of the electrical system in the vehicle. If a further consumer is switched on after starting the electric brake motor, the consumer causes a voltage drop and a current drop in the brake motor and said voltage drop and current drop can lead to an incorrect value of the clamping force that is to be determined.

In order to take into account the voltage drop or rather the current drop whilst switching on a further electrical consumer in the case of determining the clamping force, the calculation of a correcting current is disclosed in DE 10 2012 206 226 A1 and said correcting current is used as a basis for calculating the motor resistance and the motor constants that are required to determine the clamping force. The correcting current is determined from a current value that prevails prior to the voltage drop and said current value is modified using a scaling factor.

SUMMARY

The object of the disclosure is to determine the clamping force that is generated by a parking brake by way of an electric brake motor and said clamping force is to be determined using simple means and with a high degree of accuracy even in the case that during an actuation of the brake motor, additional consumers are switched on or switched off in the vehicle electrical system.

This object is achieved in accordance with the disclosure with the disclosed subject matter. The disclosed subject matter provides expedient further developments.

The method for determining the clamping force is used in the case of electromechanical parking brakes in motor vehicles that comprise an electric brake motor and the desired clamping force is generated during the actuation of said electric brake motor. The rotational movement of the rotor of the electric brake motor is transferred into an axial adjusting movement of a spindle and by way of said spindle a brake piston is pressed axially against a brake disc and said brake piston is the carrier of a brake pad.

Fundamentally, it is sufficient to provide the electric brake motor as an actuator in the parking brake. Where necessary however, the parking brake can also be equipped with an additional braking mechanism in order to be able to provide an additional clamping force on demand and in addition to the electromechanical clamping force. In the case of the additional braking mechanism, it is preferred that said device is the hydraulic vehicle brake of the vehicle and the hydraulic force of said brake acts upon the brake piston.

It is necessary to know the prevailing motor current in order to determine the actual, prevailing clamping force that is generated by the electric brake motor. The motor load torque can be calculated from the motor current and also the clamping force can be calculated by using a gear reduction ratio and the efficiency as a basis. In principle, the current and/or the voltage in the electric motor suffice as measurement values.

Once the electric brake motor is switched on, the motor current that is only restricted by means of the armature inductivity initially increases intensely and subsequently drops as a result of the armature commencing to rotate. The switch-on current step peak can be used as a result of its high dynamic response to estimate the electric motor parameters, in other words the motor resistance and the motor constants. Measurement values are determined in the falling section of the motor current that lies next to the switch-on current peak, said measurement values being used to calculate the motor parameters and also the clamping force that is dependent upon said motor parameters.

If a further electrical consumer is switched on or switched off in the phase that lies next to the switch-on peak and said electrical consumer like the electric brake motor likewise depends upon the electrical system of the motor vehicle, the voltage curve and current curve changes and said voltage curve and current curve alternate in each case in an almost abrupt manner to a lower value or accordingly higher value. By way of example, both the voltage curve as well as the current curve fall rapidly when an electrical consumer is switched on. If the motor parameters are determined from the current and voltage values after the abrupt change, this leads to an incorrect calculation of the clamping force.

The abrupt change in current curve and voltage curve of the brake motor can be compensated for or accordingly corrected in a calculative manner. For this purpose, by way of example a correcting current is determined from a current value that prevails prior to the abrupt change and a scaling factor that is to be multiplied by the current value is determined, wherein the correcting current is used as a basis for the calculation of the motor parameters that are necessary to determine the clamping force.

In the case of the method in accordance with the disclosure, the correcting current is however only referred to in order to determine the motor parameters if the standard deviation of a current curve of the brake motor exceeds a limit value, said current curve being based on measured current values. Even without switching on or switching off a further electrical consumer, the voltage and current curves of the brake motor are subject to a statistical scatter. It can be established by way of determining the standard deviation of the current values whether current value deviations are as a result of a statistical scatter or as a result of a further electrical consumer being switched on or switched off. Accordingly, different measures can be taken depending upon whether the standard deviation exceeds the allocated limit value or not.

As a consequence, it is possible from the statistical scatter of the current values to distinguish with improved precision whether an electrical consumer is switched on or switched off. If the standard deviation exceeds the allocated limit value, the correcting current is determined and said correcting current is used as the basis for calculating the motor parameters, in other words the motor resistance and the motor constants.

However, the method in accordance with the disclosure can also be applied in the case of a wide statistical scatter of the current values that is not caused as a result of an additional electrical consumer in the vehicle being switched on or switched off. Even in this case, the standard deviation exceeds an allocated limit value, whereupon the correcting current can be referred to for the purpose of determining the motor parameters. The motor parameters that are determined on the basis of the correcting current and are used as a basis for calculating the clamping force comprise in this case a higher degree of accuracy than the motor parameters that are obtained on the basis of the prevailing measured current value.

In accordance with one advantageous embodiment, the standard deviation is not directly determined from the prevailing, measured current curve but rather from a hypothetical maximal current in the case of a blocked armature of the brake motor, in other words in the case of the motor being at a standstill, wherein the hypothetical maximal current is determined on the basis of multiple sequential, measured current values. The maximal current in the case of the motor being at a standstill is in particular determined as a function of measured first and second current values, wherein in addition, an idle running current is taken into account.

The method in accordance with the disclosure is preferably implemented during the process of applying the parking brake, wherein the clamping force is generated for the purpose of keeping a vehicle stationary. The standard deviation is calculated on the basis of multiple current values that follow one another sequentially, wherein the period of time that is considered in order to calculate the standard deviation lies preferably sequentially after the switch-on current peak of the motor current and said period of time directly follows the switch-on process.

In principle, the method can also be implemented during a process of releasing the parking brake following the occurring switch-on current peak, expediently however only until the gear mechanism play is overcome and the force is reduced. It is also good to identify this phase by way of the standard deviation.

Expediently, the process of determining the standard deviation is repeatedly performed. It can thus be expedient by way of example to determine the standard deviation multiple times one after the other on the basis of measured current values during an idle running phase that occurs directly after the switch-on current peak and the motor current in said idle running phase comprises almost a constant current. In this case, it is both possible that in each case a defined number of current values in particular a constant number of current values is used for the process of determining the standard deviation as well as an increasing number of current values as time progresses. As soon as a calculated standard deviation lies above the limit value, the correcting current is determined and is used as a basis for calculating the motor parameters.

The algorithm for determining the motor parameters can be embodied in such a manner that it is disabled in the case of a standard deviation that is too wide. However, in order to determine the parameters, a minimum number of current value pairs should be available expediently until the point of disablement for the purpose of calculating Imax, by way of example five current value pairs The method in accordance with the disclosure is performed in either a closed-loop control device or open-loop control device in the vehicle and said closed-loop control device or open-loop control device is expediently a component of the parking brake.

BRIEF DESCRIPTION OF THE DRAWINGS

Further advantages and expedient embodiments are evident in the disclosure, the description of the figures and the drawings. In the drawings.

DETAILED DESCRIPTION

Figure 1:
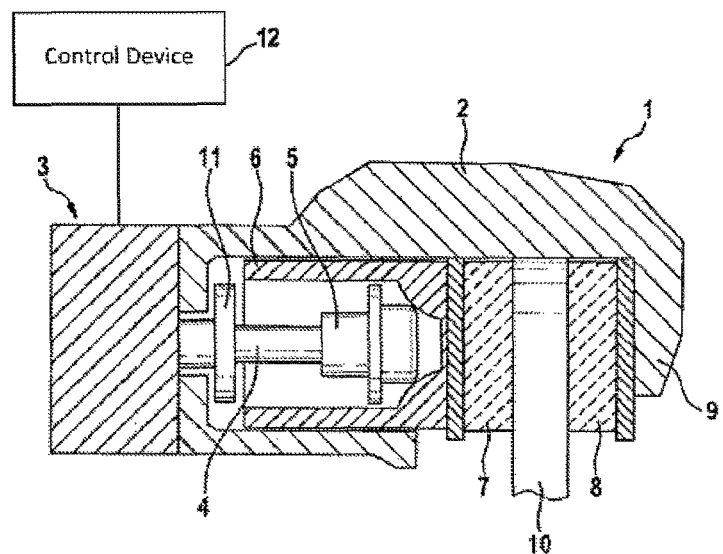
FIG. 1 illustrates a sectional view of an electromechanical parking brake for a vehicle and the clamping force is generated in said parking brake by way of an electric brake motor.

FIG. 1 illustrates an electromechanical parking brake 1 for the purpose of keeping a vehicle stationary. The parking brake 1 comprises a brake caliper 2 having a pincer arrangement 9 that engages with a brake disc 10. The parking brake 1 comprises an electric motor as a brake motor 3 as an actuating element and said electric motor drives a spindle 4 in a rotating manner and a spindle component 5 that is embodied as a spindle nut is mounted on said spindle in a rotatable manner. In the case of a rotation of the spindle 4, the spindle component 5 is adjusted axially. The spindle component 5 moves within a brake piston 6 that is the carrier of a brake pad 7 and said brake pad is pushed against the brake disc 10 by the brake piston 6. A further brake pad 8 is located on the opposite lying face of the brake disc 10 and said further brake pad is held stationary on the pincer arrangement 9.

The spindle component 5 can move within the brake piston 6 in the case of a rotational movement of the spindle 4 axially forwards in the direction of the brake disc 10 or accordingly in the case of a rotational movement of the spindle 4 in the opposite direction axially rearwards until reaching a stop 11. The spindle component 5 acts upon the inner front face of the brake piston 6 so as to generate a clamping force, whereby the brake piston 6 that is mounted in the parking brake 1 in such a manner that it can be axially displaced is pushed with the brake pad 7 against the front face of the brake disc 10 that is facing said brake pad.

The parking brake can when necessary be supported by a hydraulic vehicle brake so that the clamping force is made up of an electro motorized portion and a hydraulic portion. In the case of the hydraulic support, the rear face of the brake piston 6 that faces the brake motor is influenced by hydraulic fluid that is under pressure.

Figure 2:
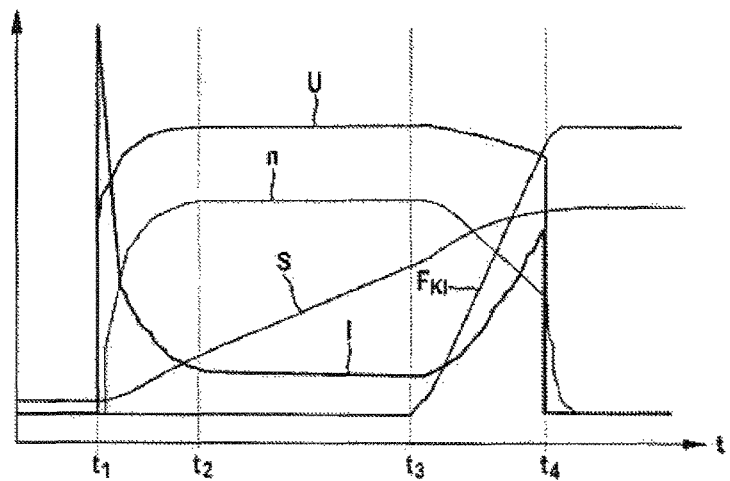
FIG. 2 illustrates a graph showing the progression with respect to time of the current, the voltage and the motor rotational speed during the process of applying the parking brake.

FIG. 2 illustrates a graph of the progression with respect to time of the current I, the voltage U and the rotational speed n of the electric brake motor for a process of applying the parking brake. Furthermore, the electromechanical clamping force $F_{KI}$ is plotted in FIG. 2, said electromechanical clamping force being generated by the electric brake motor, and also plotted is the path s that is covered by the brake motor or accordingly an actuating element that is influenced by the brake motor during the process of applying the parking brake.

The process of applying the parking brake begins at the point in time t1, in that an electrical voltage is applied and the brake motor is supplied with a current in the case of a closed electrical circuit. The start phase (Phase I) lasts from the point in time t1 to the point in time t2. At the point in time t2, the voltage U and the motor rotational speed n have reached their maximum value. The phase between t2 and t3 represents the idle running phase (Phase II) in which the current I moves to a minimum level. At this point, after the point in time t3, the force build-up phase (Phase III) occurs until the point in time t4 at which point, the brake pads lie on the brake disc and are pressed with increasing clamping force $F_{KI}$ against the brake disc. At the point in time t4, the process of switching off the electric brake motor occurs by means of opening the closed electrical circuit so that as the curve progresses, the rotational speed n of the brake motor falls to zero.

At the point in time t3, the point at which the force increases coincides with the phase during which force is built up. The build-up of force or accordingly the curve of the clamping force $F_{KI}$ can by way of example be determined with reference to the curve of the current I of the brake motor and said curve fundamentally comprises the same curve as the electromechanical clamping force. The current curve gradient increases steeply at the beginning of the point in time t3 starting with the low level during the idle running phase between t2 and t3. This increase of the current can be detected and used for the purpose of determining the point at which the force increases. Fundamentally the curve of the build-up of force can however also be determined from the voltage curve or rotational speed curve or rather from a user-defined combination of the signals current: voltage and rotational speed.

In order to determine the clamping force $F_{KI}$ without using a rotational speed sensor, the motor constant $K_M$ and the motor resistance $R_M$ are required as motor characteristic variables and said variables are determined from the curve of the voltage and current of the electric brake motor. The current increases during the process of switching on the brake motor and is only intensely restricted as a result of the armature inductivity and subsequently reduces significantly more slowly as a result of the commencing rotation. In the decreasing section, the current curve is essentially determined by the mechanical time constant of the motor and said time constant is influenced by the mass inertia of the armature J, the motor constants $K_M$ and the motor resistance $R_M$.

Figure 3:
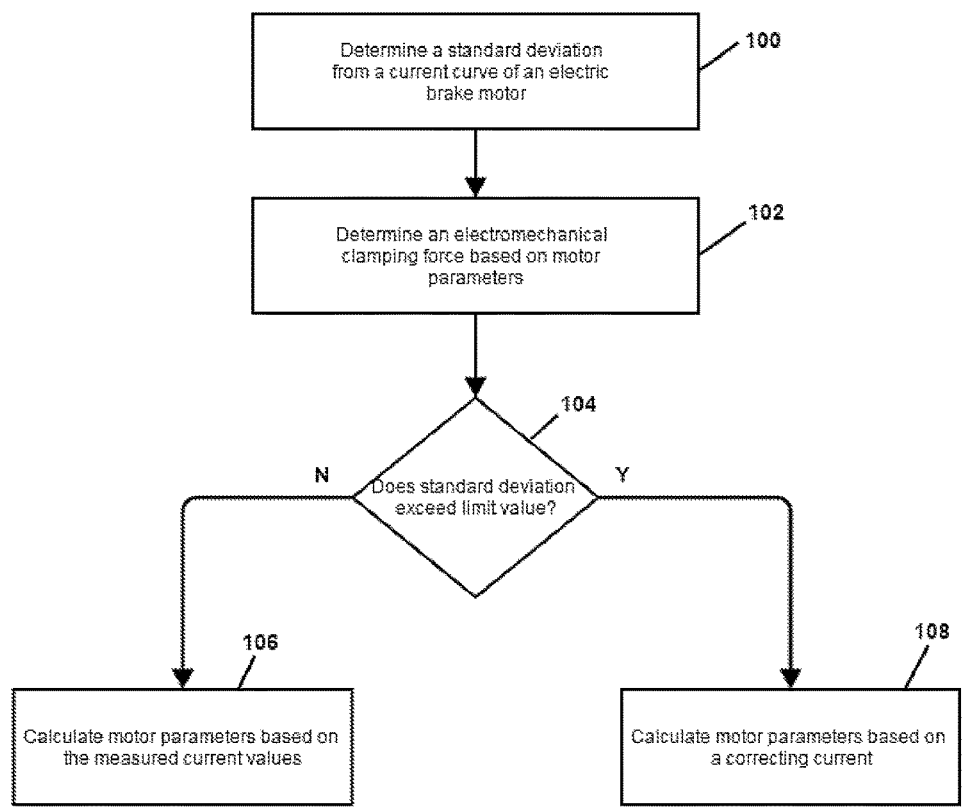
FIG. 3 is a flowchart of a method for determining the clamping force generated by an electric brake motor of a parking brake.

Referring now to the flowchart of FIG. 3, deviations in the current values are taken into account for determining the motor constants $K_M$ and the motor resistance $R_M$ to improve the ability to determine the clamping force generated by the brake motor by considering whether said deviations occur as a result of a natural statistical scattering or as a result of an electrical consumer being switched on or switched off in the vehicle electrical system. For this purpose, a standard deviation of a current curve of the brake motor is determined (block 100), said current curve being based on measured current values and is compared with a limit value (block 104). If the standard deviation does not exceed the limit value, the measured current values can be used to determine the motor parameters (block 106) which are used to calculate the clamping force generated by the brake motor (block 102). If the standard deviation exceeds the limit value, a correcting current that is taken as a basis for determining the motor parameters is referred to in calculating the motor parameters (block 108). The method may be performed by a control device 12 (FIG. 1) of the vehicle. The control device 12 may comprise a closed-loop or open-loop control device.

The standard deviation is determined on the basis of a theoretical or rather hypothetical maximal current that would prevail while the motor is at a standstill, in other words in the case of a blocked armature. The hypothetical maximal current is determined from the actual, measured current values before or during a process of applying the parking brake at a point in time in which the current has at least almost achieved its steady state. For this purpose, in the decreasing section after the switch-on current peak has been passed, the current is measured at two points in time $t_{1,m}$ and $t_{2,m}$ and from these measurements the theoretical or rather hypothetical maximal current $I_{max}$ that would flow through the motor when the brake motor is at a standstill is calculated. The maximal current $I_{max}$ is calculated by taking into account the idle running current $I_L$ that is determined in the phase after the switch-on current peak in which phase the rotational speed is constant and the idle running current is only determined by the load or rather the friction of the motor and said maximal current $I_{max}$ is calculated in accordance with the equation $$I_{max} = \frac{(I_1 - I_L)^2}{I_2 - I_L} + I_L$$

wherein $I_1$, $I_2$ describe the current values that are measured at the points in time $t_{1,m}$ and accordingly $t_{2,m}$.

The points in time $t_{1,m}$ and $t_{2,m}$ relate to the beginning of the current flow. The point in time $t_2$ lies twice as far from the beginning of the current flow as the point in time $t_{1,m}$.

The standard deviation s can be calculated from the maximal current $I_{max}$ in accordance with $$s = \sqrt{\frac{1}{n-1}\left(\sum_{i=1}^{n} I_{max,i}^2 - \frac{1}{n}\left(\sum_{i=1}^{n} I_{max,i}\right)^2\right)}$$

wherein "n" describes the total number of values of the maximal current $I_{max}$ to be taken into account. The standard deviation s that is determined is compared to an allocated limit value. If the standard deviation s lies above the limit value, it can be assumed that an electrical consumer has been switched on or switched off, said electrical consumer being dependent upon the electrical system of the vehicle. However, the deviation range of the current values is too high even without an electrical consumer being switched on or switched off in order to be able to determine the motor parameters with sufficient accuracy based on the measured current values. Therefore in the case that the standard deviation s exceeds the limit value, a correcting current $I_{cor}$ is referred to and said correcting current is used as a basis for calculating the motor parameters.

Subsequently, the calculation of the correcting current $I_{cor}$ is described on the basis of the prevailing current curve $I_s$ for the case that at the point in time $t_{spr}$ an additional electrical consumer that depends likewise as with the electric brake motor on the vehicle electrical system is switched on whereupon both the voltage as well as the current almost abruptly decrease.

In order to conclude the ideal current curve $I_{cor}$ from the prevailing current curve $I_s$, said ideal current curve being a basis of determining the motor parameters, a scaling factor $f_{cor}$ is determined from the ratio of the voltage step change $\Delta U$ at the point $t_{spr}$ in the voltage curve U. The voltage step change $\Delta U$ is placed in the relationship to a voltage value $U_{t1}$ that prevails prior to the step change minus a voltage constant $U_{const}$:

$$f_{cor}(t_{spr}) = \frac{\Delta U(t_{spr})}{U(t_1) - U_{const}},$$

wherein the voltage value $U_{t1}$ is measured at the point in time $t_1$ that lies before the step change point in time $t_{spr}$.

The scaling factor $f_{cor}$ that is determined in this manner is used to determine the correcting current $i_{cor}$ that corresponds to the ideal curve of the motor current without a further consumer being switched on and said process of determining the correcting current is performed in accordance with the following equation:

$$I_{cor}(t_{spr}) = I_s(t_{spr}) + f_{cor}(t_{spr}) \cdot (I_{t1} - I_L)$$

In this case:

$I_{cor}(t_{spr})$ describes the corrected current after the step change at the point in time $t_{spr}$;

$I_s(t_{spr})$ describes the prevailing current after the step change at the point in time $t_{spr}$;

$f_{cor}(t_{spr})$ describes the scaling factor after the step change at the point in time $t_{spr}$;

$I_{t1}$ describes the current value before the step change at the point in time $t_1$ and $I_L$ describes the idle running current that is taken after the switch-on current step change in a load-free stable state.

Expediently, multiple current values $I_{cor}$ are calculated at further points in time $t_{spr+1}, t_{spr+2} \ldots t_{spr+n}$ after the step change by taking into account the scaling factor $f_{cor}$ from measured current values I at time points $t_2, t_3 \ldots t_{n+1}$ before the step change and also from measured current values $I_S$ at points in time $t_{spr+1}, t_{spr+2} \ldots t_{spr+n}$ after the step change:

$$I_{cor}(t_{spr+1}) = I_s(t_{spr+1}) + f_{cor}(t_{spr}) \cdot (I_{t2} - I_L)$$

$$I_{cor}(t_{spr+2}) = I_s(t_{spr+2}) + f_{cor}(t_{spr}) \cdot (I_{t3} - I_L)$$

$$I_{cor}(t_{spr+n}) = I_s(t_{spr+n}) + f_{cor}(t_{spr}) \cdot (I_{tn+1} - I_L)$$

In this manner, the ideal current curve over the entire time range can be determined by way of the correction of the current value.

The motor resistance $R_M$ can be determined from the relationship between the motor voltage or rather the operating voltage $U_B$ and the maximal current $I_{max}$ by taking into account the additional measured motor voltage or rather operating voltage $U_B$ in accordance with $$R_M = \frac{U_B}{I_{max}}$$

In the case of a voltage drop, the maximal current $I_{max}$ is calculated from the corrected current values $I_{cor}$ at the point in time t and the doubled point in time 2t in accordance with $$I_{max} = \frac{(I_{cor}(t) - I_L)^2}{I_{cor}(2t) - I_L} + I_L$$

The voltage constant $U_{const}$ that is used while calculating the scaling factor $f_{cor}$ can be determined as a product of the motor resistance $R_M$ and the idle running current $I_L$. Since the motor resistance $R_M$ is not yet available at the point in time of the compensation calculation for the voltage drop, it is necessary to use a preset value. The maximal current $I_{max}$ and motor resistance $R_M$ are calculated afresh using the compensated current curve and the maximal current $I_{max}$ is evaluated by way of the standard deviation. If this is still too high, a further iteration must be performed.

The motor constant $K_M$ can be determined from parameters of the brake motor, namely from the mechanical time constants $\tau_M$ of the brake motor, the motor resistance $R_M$ and the motor moment of inertia $J_{ges}$:

$$K_M = \sqrt{\frac{R_M \cdot J_{ges}}{\tau_M}},$$

wherein the mechanical time constant $\tau_M$ can be determined from the equation:

$$\tau_M = \frac{t}{\ln((I_{max} - I_L)/(I(t) - I_L))}$$

With the above described method, the motor constant $K_M$ can be determined before each process of applying the electromechanical parking brake and with sufficient accuracy even in the case of a wide statistical scatter of measured current values. The motor load torque in the electric brake motor can be determined in the case of knowing the prevailing current by taking into account the motor constants $K_M$. The clamping force $F_{KI}$ can be determined from the motor load torque.

What is claimed is:

1. A method for determining an electromechanical clamping force generated by an electric brake motor of a parking brake of a vehicle, comprising:
    measuring current values of a motor current of the electric brake motor using a current sensor;
    determining a standard deviation from a current curve of the electric brake motor of the parking brake using a control device of the parking brake, the current curve being based on the measured current values; and
    determining the electromechanical clamping force based on motor parameters of the electric brake motor using the control device,
    wherein the control device is configured to calculate the motor parameters based on the measured current values when the standard deviation does not exceed a limit value,
    wherein the control device is configured to calculate the motor parameters based on a correcting current when the standard deviation exceeds the limit value, the correcting current being a product of (i) a measured current value obtained prior to the standard deviation exceeding the limit value and (ii) a scaling factor.

2. The method according to claim 1, wherein the determination of the correcting current further comprises:
    determining the correcting current based on a product of the scaling factor and a difference between the measured current value obtained prior to the standard deviation exceeding the limit value and an idle running current, using equation:

$$I_{cor}(t_{spr}) = I_s(t_{spr}) + f_{cor}(t_{spr}) \cdot (I_{t1} - I_L),$$

wherein $t_{spr}$ is a time at which the standard deviation increases above the limit value $I_{cor}(t_{spr})$ is the correcting current after the increase in the standard deviation at time $t_{spr}$, $I_s(t_{spr})$ is a measured current value obtained after the increase in the standard deviation at the time $t_{spr}$, $f_{cor}(t_{spr})$ is the scaling factor after the increase in the standard deviation at the time $t_{spr}$, $I_{t1}$ is the measured current value obtained before the standard deviation exceeds the limit value, and $I_L$ is the idle running current.

3. The method according claim 1, further comprising:
calculating different correcting current values corresponding to different points in time after the standard deviation exceeds the limit value with reference to the scaling factor used with the measured current value obtained prior to the the standard deviation exceeding the limit value.

4. The method according claim 1, further comprising:
determining the scaling factor based on a ratio of a voltage step change obtained at a time when the standard deviation exceeds the limit value to a voltage value obtained prior to the standard deviation exceeding the limit value.

5. The method according claim 1, wherein the measured current values are taken during an application of the parking brake.

6. The method according to claim 1, further comprising:
repeatedly performing the determination of the standard deviation and the correcting current.

7. The method of claim 1, further comprising:
applying the parking brake based on the determined electromechanical clamping force.

8. The method according to claim 1, wherein the measured current values are taken during switching-on of the brake motor.

9. The method according to claim 8, wherein the measured current values are taken following a peak of a switch-on current.

10. The method according to claim 1, wherein the determination of the standard deviation further comprises:
determining the standard deviation from a hypothetical maximal current if the brake motor is at a standstill, the maximal current being determined from multiple sequential, measured current values.

11. The method according to claim 10, further comprising:
determining the standard deviation from the hypothetical maximal current, the maximal current being based on equation:

$$I_{max} = \frac{(I_1 - I_L)^2}{I_2 - I_L} + I_L,$$

wherein $I_L$ is an idle running current $I_1$ is a first measured current value taken at time $t_{1,m}$, and $I_2$ is a second measured current value taken at time $t_{2,m}$.

12. A closed-loop control device configured to perform a method for determining an electromechanical clamping force generated by an electric brake motor of a parking brake of a vehicle, the closed loop control device comprising:
a control device configured to:
receive current values of a motor current of the electric brake motor from a current sensor of the vehicle;
determine a standard deviation from a current curve of the electric brake motor of the parking brake, the current curve being based on the current values received from the current sensor; and
determine the electromechanical clamping force based on motor parameters of the electric brake motor,
wherein the control device is configured to calculate the motor parameters based on the measured current values when the standard deviation does not exceed a limit value, and
wherein the control device is configured to calculate the motor parameters based on a correcting current when the standard deviation exceeds the limit value, the correcting current being a product of (i) a measured current value obtained prior to the standard deviation exceeding the limit value and (ii) a scaling factor.

13. The closed-loop control device according to claim 12, wherein the closed-loop control device is included in the parking brake of a vehicle.

14. An open-loop control device configured to perform a method for determining an electromechanical clamping force generated by an electric brake motor of a parking brake of a vehicle, the open-loop control device comprising:
a control device configured to:
receive current values of a motor current of the electric brake motor from a current sensor of the vehicle;
determine a standard deviation from a current curve of the electric brake motor of the parking brake, the current curve being based on the current values received from the current sensor; and
determine the electromechanical clamping force based on motor parameters of the electric brake motor,
wherein the control device is configured to calculate the motor parameters based on the measured current values when the standard deviation does not exceed a limit value, and
wherein the control device is configured to calculate the motor parameters based on a correcting current when the standard deviation exceeds the limit value, the correcting current being a product of (i) a measured current value obtained prior to the standard deviation exceeding the limit value and (ii) a scaling factor.

15. The open-loop control device according to claim 14, wherein the open-loop control device is included in the parking brake of a vehicle.

* * * * *

UNITED STATES PATENT AND TRADEMARK OFFICE
CERTIFICATE OF CORRECTION

PATENT NO. : 9,744,951 B2
APPLICATION NO. : 14/595509
DATED : August 29, 2017
INVENTOR(S) : Ullrich Sussek Page 1 of 1

It is certified that error appears in the above-identified patent and that said Letters Patent is hereby corrected as shown below:

In the Claims

In Column 9, Lines 6-7, Lines 15-16 of Claim 2 should read:

$I\_s(t\_spr)$ is a measured current value obtained after the increase in the standard deviation at the time $t\_spr$, Signed and Sealed this
Fifth Day of December, 2017

Joseph Matal
*Performing the Functions and Duties of the*
*Under Secretary of Commerce for Intellectual Property and*
*Director of the United States Patent and Trademark Office*